US006557703B1

United States Patent
Leitner

(10) Patent No.: US 6,557,703 B1
(45) Date of Patent: May 6, 2003

(54) COIL STRAP WITH NAILS FOR USE IN A NAIL HAMMER

(76) Inventor: Helmut Leitner, St. Georgen Klaus 102, A-3340 Waidhofen/Ybbs (AU)

( * ) Notice: Subject to any disclaimer, the term of this patent is extended or adjusted under 35 U.S.C. 154(b) by 0 days.

(21) Appl. No.: 09/159,647

(22) Filed: Jan. 18, 2001

(30) Foreign Application Priority Data

| Sep. 24, 1997 | (AT) | 596/97 U |
| Jan. 15, 1998 | (AT) | 18/98 U |
| Mar. 16, 1998 | (EP) | 98 104 659.2 |

(51) Int. Cl.[7] .................. B65D 85/24; F16B 15/08
(52) U.S. Cl. .................. 206/338; 206/345; 411/442
(58) Field of Search .................. 206/338, 339, 206/340, 341, 343–345; 411/442; 227/136, 137

(56) References Cited

U.S. PATENT DOCUMENTS

| 3,083,369 A | * | 4/1963 | Peterson | 206/345 |
| 3,442,374 A | * | 5/1969 | Hillier | 206/344 |
| 3,768,124 A | * | 10/1973 | Maynard | 206/345 |
| 3,851,759 A | * | 12/1974 | Young et al. | 206/338 |
| 4,433,782 A | * | 2/1984 | Figge et al. | 206/338 |
| 4,679,975 A | * | 7/1987 | Leistner | 227/136 |
| 4,712,676 A | * | 12/1987 | Randall | 206/338 |
| 5,020,663 A | * | 6/1991 | Dallas et al. | 206/338 |
| 5,634,582 A | * | 6/1997 | Morrison, Jr. et al. | 206/338 |
| 5,909,993 A | * | 6/1999 | Leistner | 411/442 |

FOREIGN PATENT DOCUMENTS

| WO | WO 88/08087 | * | 10/1988 | 206/338 |

* cited by examiner

Primary Examiner—Bryon P. Gehman
(74) Attorney, Agent, or Firm—Cahn & Samuels, LLP

(57) ABSTRACT

Coil strapped nails and a nailing device using coil strapped nails are provided. The coil may be provided with steel nails (1) having a length of 14 to 25 mm and a shaft diameter of 2 to 3 mm. The nails are held by wires (2,3) 6.5 to 7.5 mm apart, wherein the wires are preferably quenched and tempered. In the center of the coil a wrapping sleeve may be provided having due clearance for the nail heads.

4 Claims, 2 Drawing Sheets

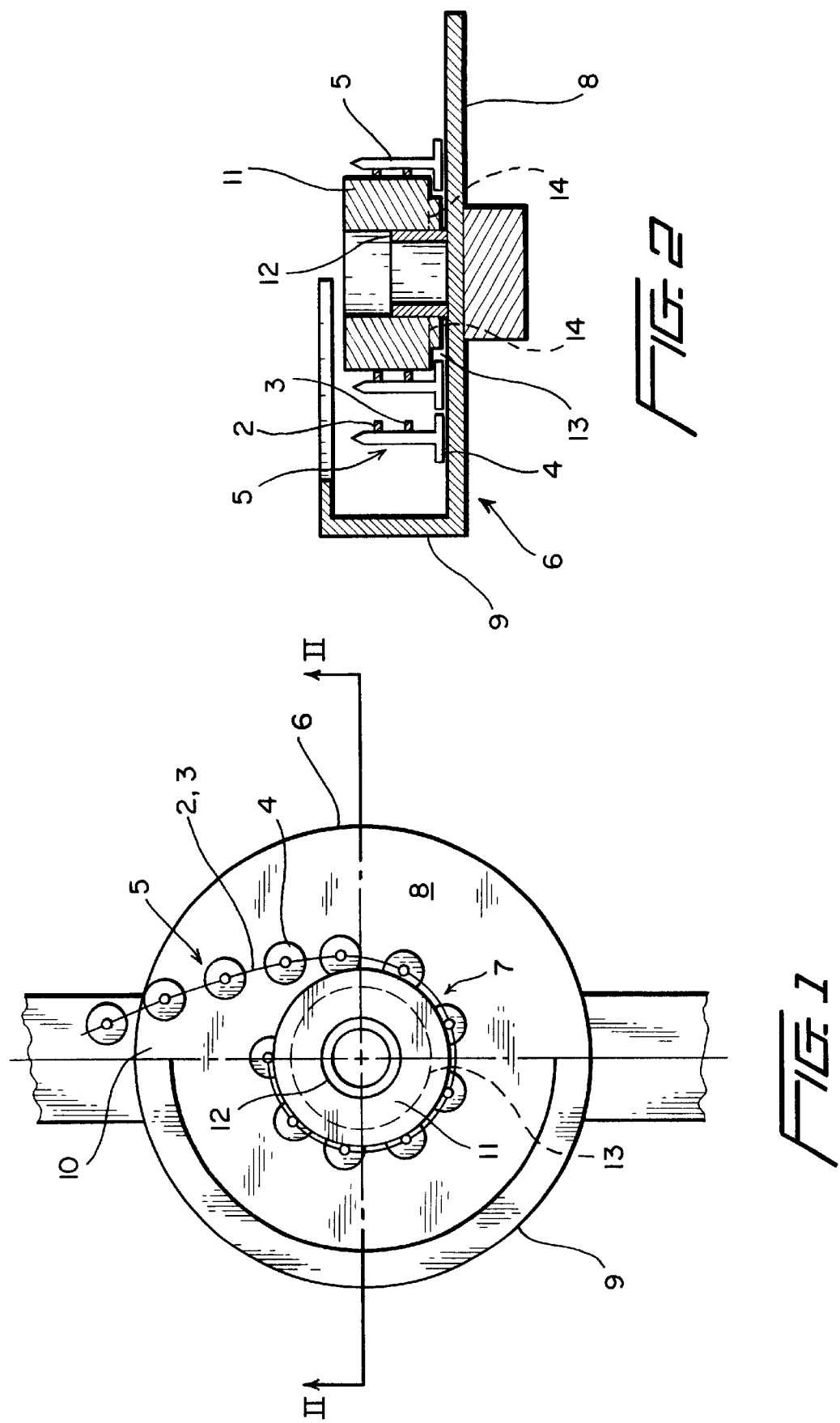

COIL STRAP WITH NAILS FOR USE IN A NAIL HAMMER

I. BACKGROUND OF THE INVENTION

1. Field of the Invention

The present invention relates to coil strapped nails, as well as a nailing device and nail coil for use in a nailing device. More particularly, the invention relates to a coil strap with steel nails, which are integrally connected by means of at least two wires, as well as a nail strapped coil and a nailing device.

2. Description of the Related Technology

Nailing devices, which are powered by compressed air, gas, electrical energy or by hand and which use nails stored in a magazine are known in the art. Typically a nailing magazine contains up to 140 parallel-aligned nails, which are connected, e.g. welded, to each other by means of a wire at the nail shafts. The ductility of the wire permits a wrapping of the nail strap into a coil, in which shape it is used in the respective nailing device. Current designs feature connecting wires made of soft, unalloyed metals, which permit easy coiling and welding of the wire-nail connection. One drawback of these devices is that the use of such a design in a nailing device is difficult if not impossible, as the hammer action causes a reduction of the nail pitch. The nails, furthermore, incline towards the magazine center. When in use, repeated malfunctions of the nailing device occur as the nails, as mentioned before, jam due to twisting, reduction of nail pitch and excessive inclination of the nails by means of the hammer action. These malfunctions are particularly evident, when the nail strap is nearly used up and the remaining nail strap is unsupported inside the magazine. These disadvantages have to be eliminated.

Extensive research has been devoted to the connection between wire and nail shaft (where an unintentional reduction of nail pitch and inclining of the nails was to be avoided). However, there remains a need for a trouble free separation of nail and wire within the nailing device during hammer action, while ensuring a proper wire-nail-weld.

II. SUMMARY OF THE INVENTION

Accordingly, an object of the present invention is to provide coil strapped nails, which oppose a twisting, misaligning of nails and which ensures a reliable separation of nail from wire within the nailing device by means of the hammer action, thus enabling trouble free and fast work. It is also an object of the invention to design the nail strap coil and the nailing device in such way as to prevent a jamming of the nail strap.

According to one aspect of the invention, in order to avoid misalignment of nails within the nailing device and subsequent jamming of the nailing device, it is proposed to use a quenched and tempered metal. This offers the advantage that the wires can be hardened, which greatly influences the ductility of the wires, while ensuring reliable positioning of the nails of the nail strap during drive-in.

With respective tensile strength of the wire, the problem is solved for nails 14 to 25 mm long and a shaft diameter of 2 to 3 mm, preferably 2.5 mm in that the wires are pitched at 6.5 to 7.5 mm, preferably 7 mm, to each other. At the predetermined nail length and pitch claimed by this invention, only a minimal deviation of the nail pitch from the desired position is possible, which prevents jamming of the nailing device. At the same time, the pitch between nails is short enough for the impact element of the nailing device to impact on both connecting points of wire to nail, thus ensuring a reliable separation of the nail from the wires.

According to a preferred embodiment, nails with heads are preferable. The wire nearer the head is 9 to 11 mm, preferably 10 mm, distant from head to connecting point on the shaft. This distance of the wire nearer the head to the head ensures a trouble free separation of the nail from the wires. The distance of the wire nearer the head is generally equal to the diameter of the head. In an exemplary embodiment, the nail strap contains 70 to 85 nails, preferably 80 nails, which avoids a too frequent changing of the nailing device, while ensuring a usable size and weight of the nail magazine. The size of the coil strap is limited by the weight of the nail strap and by the size of the magazine.

As is known, nails are preferably inclined by 15 degrees to the vertical with the wires being in horizontal position. As described previously, quenched and tempered connecting wires are preferred, which keep the nails in a somewhat flexible position, thus avoiding malfunction. This feature is however not sufficient in all cases. Furthermore it may be necessary to use ordinary coil strapped nails without quenched and tempered wires.

According to the invention, it is furthermore envisaged to use a wrapping sleeve inside the coil where the outside diameter of the wrapping sleeve is identical to the inside diameter of the coil and where the cylindrical face of the wrapping sleeve is in contact with the nail shafts or wires respectively of the inner coillage, but with clearance for the nail heads. One design features a cylindrical wrapping sleeve where a distance from the magazine floor is maintained, allowing clearance for the nail heads of the inner coillage, which protrude inwards and underneath the wrapping sleeve. A different design features a wrapping sleeve with a groove suitable to accommodate the nail heads. Further features are determined by their application and can be derived from the description and drawings.

The present invention is also directed to nail strapped coils for application in such a nailing device where the coil displays the described features.

III. BRIEF DESCRIPTION OF THE DRAWINGS

The following drawings describe the invention wherein:

FIG. 1 is a top view of part of a nailing device according to the invention;

FIG. 2 is a cross-sectional view of the nailing device of FIG. 1 taken along line II—II.

IV. DESCRIPTION OF THE PREFERRED EMBODIMENTS

Figure 3:
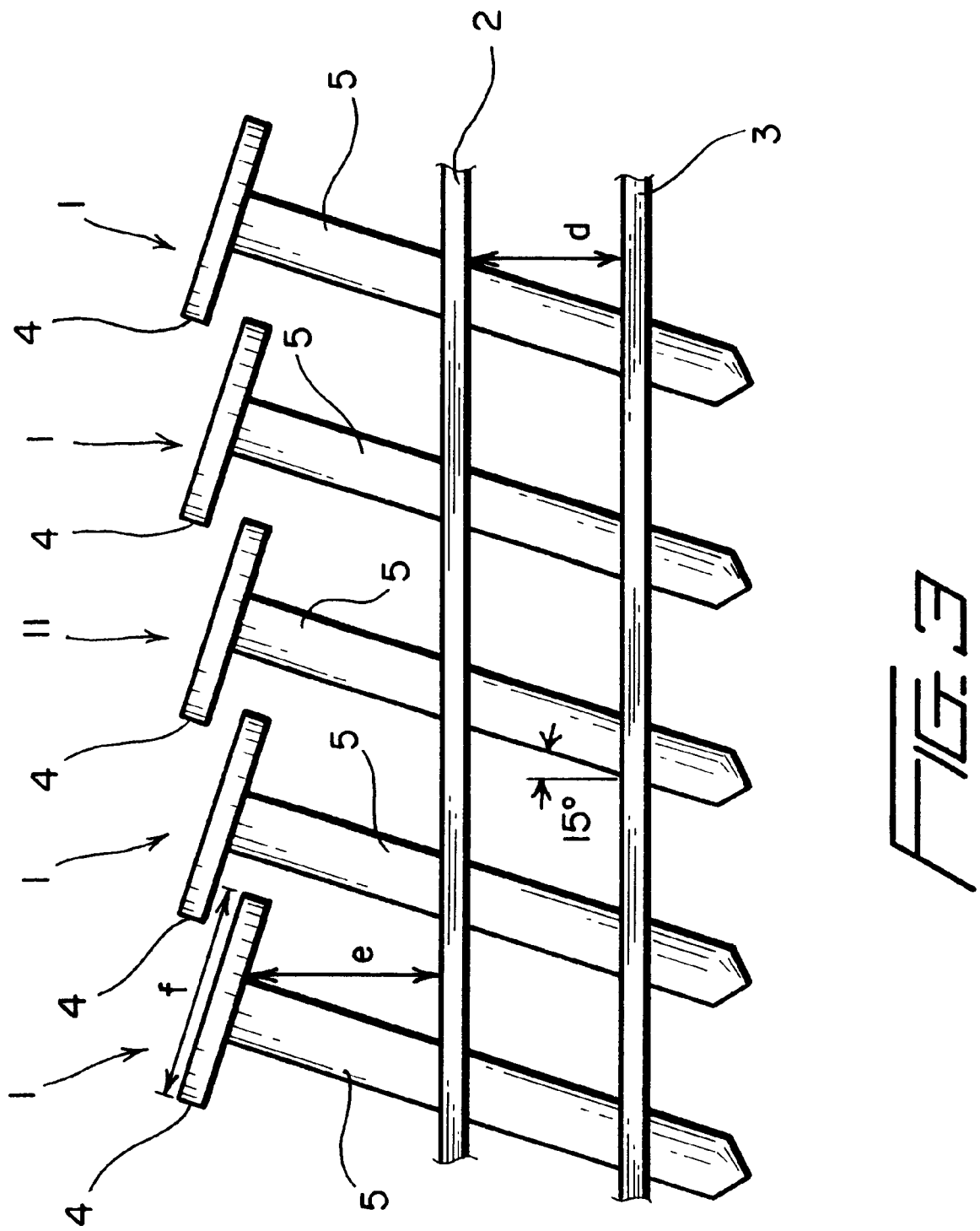
FIG. 3 is a partial side view of an embodiment of a nail strap according to the invention.

FIG. 1 shows a top view of a magazine of the nailing device as is applicable to EP 0 321 440. Other relevant parts of the nailing device, as well as the magazine lid, have been deleted to give a clearer picture. In magazine (6) lies the nail strap coil. It consists of a series of nails which are connected by means of two wires (2,3) arranged one above the other to form a strap.

The illustration shows the coil in its final stage where most of the nails have been used up. The magazine floor is identified as 8. The magazine wall (9) extends over one half of the magazine. The magazine can be closed with a lid, whereby the nail strap exits via opening (10) towards the hammerhead, which is not shown here. According to the invention under consideration a wrapping sleeve (11) is required, which together with coil (7) is fitted to stub (12) of the magazine and allowed to rotate.

One design of the wrapping sleeve features an annular groove (13) on the side facing the magazines floor (8), which allows nail heads (4) to pass. A dotted line (14) indicates the underside of the wrapping sleeve, where in a different design the groove is replaced by the wrapping sleeve being developed as a cylinder and arranged in such a way that nail heads (4) come to lie underneath the wrapping sleeve, allowing clearance for the nail heads.

The unwinding of the nail strap during actuation of the nailing device is in both cases guaranteed as the innermost coil is fixed in a vertical position by the cylindrical wall of the wrapping sleeve. This is true even when the coil is almost used up, as shown in FIG. 1.

FIG. 2 shows a section along line II—II in FIG. 1, where the left hand side displays an alternative position of the coil. In this case as an alternative an annular groove (13) is cut deep enough to allow enough space for nail heads (4).

The coil strapped nails may be wrapped around the wrapping sleeve right from the beginning, whereby the coil is mounted together with the wrapping sleeve. The wrapping sleeve may be provided separately as an accessory to the nailing device, where the wrapping sleeve is fitted concentric into the prepared nail strap coil.

The height of the wrapping sleeve is equal to the height of the nail strap. In any case it is to be ensured that the nails of the inner coil position and their respective connecting wires (2,3) are resting on the cylindrical face of the wrapping sleeve.

As according to FIG. 3 the nail strap has to be designed in such a way so that several nails (1) with heads (4) and shafts (5) align parallel to each other and are connected by means of two wires (2,3). Wires (2,3) are separated by pitch "d" from each other. Wire (2), which is nearer the head has the distance "e" from head (4) and nail (1), which is equal to diameter "f" of their heads (4). Shafts (5) of nails 1 are inclined by 150 to the vertical, whereby wires (2,3) are horizontal. The above-mentioned measurements and ratios of measurements have, surprisingly enough, proved to be successful.

If, according to one alternative, the wires are quenched and hardened, their hardness may be varied, which limits sag and reduction of pitch. This in turn allows better control and predictability of the movement of fed nails, thus ensuring trouble free feed of the nail strap. Improvement in the relevant property of the wires may be achieved by stretching of the wires with a pulling force of 39 to 70 kp/mm2=390 to 700 N/mm2.

What is claimed is:

1. A nail coil comprising:
    a plurality of generally identically shaped nails each having a head on a first end and a point on a second end, said nails having a length from about 14 to 25 mm and having a shaft diameter from about 2 to 3 mm;
    a first wire having a generally uniform cross-section attached to the shafts of said nails in an area about 9 to 11 mm from said nail heads;
    a second wire having a generally uniform cross-section disposed parallel to said first wire and attached to said nail shafts a distance of about 6.5 to 7.5 mm from said first wire, wherein said nails are held by said wires at an angle of about 15 degrees relative to said wires, and wherein said wires have been quenched and hardened to a tensile strength of about 390 to 700 N/mm2; and
    wherein said nails and wires are rolled into a coil.

2. The nail coil of claim 1, wherein said coil comprises from about 75 to 85 nails.

3. The nail coil of claim 2, wherein said coil comprises 80 nails.

4. The nail coil of claim 1, wherein said nail heads have a diameter equal to the distance said first wire is disposed from said nail heads.

* * * * *

UNITED STATES PATENT AND TRADEMARK OFFICE
CERTIFICATE OF CORRECTION

PATENT NO.    : 6,557,703 B1                                         Page 1 of 1
DATED         : May 6, 2003
INVENTOR(S)   : Leitner It is certified that error appears in the above-identified patent and that said Letters Patent is hereby corrected as shown below:

<u>Title page,</u>
Item [22], Filed, should read -- September 24, 1998 --

Signed and Sealed this

Twenty-sixth Day of August, 2003

JAMES E. ROGAN
*Director of the United States Patent and Trademark Office*